US006532498B1

United States Patent
Hager et al.

(10) Patent No.: US 6,532,498 B1
(45) Date of Patent: *Mar. 11, 2003

(54) METHOD AND SYSTEM FOR EVENT NOTIFICATION BETWEEN SOFTWARE APPLICATION PROGRAM OBJECTS

(75) Inventors: Delmar G. Hager, Austin, TX (US); Thomas J. Traughber, Lucas, TX (US); Brigitte B. Birze, Plano, TX (US)

(73) Assignee: Computer Associates Think, Inc., Islandia, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/970,236

(22) Filed: Nov. 13, 1997

Related U.S. Application Data

(63) Continuation of application No. 08/341,247, filed on Nov. 17, 1994, now abandoned.

(51) Int. Cl.$^7$ .................................................. G06F 9/46
(52) U.S. Cl. ....................................................... 709/318
(58) Field of Search .............................. 395/683, 680, 395/681; 709/307, 300, 301, 318, 314, 315, 310

(56) References Cited

U.S. PATENT DOCUMENTS

| | | | | |
|---|---|---|---|---|
| 5,133,075 A | * | 7/1992 | Risch .......................... | 395/800 |
| 5,237,684 A | * | 8/1993 | Record et al. ................ | 395/650 |
| 5,475,843 A | * | 12/1995 | Halviatti et al. ............. | 395/683 |
| 5,504,896 A | * | 4/1996 | Schell et al. ................. | 395/650 |
| 5,652,888 A | * | 7/1997 | Burgess ....................... | 709/303 |
| 5,870,605 A | * | 2/1999 | Bracho et al. ............... | 395/682 |

OTHER PUBLICATIONS

SOMobjects Developer Toolkit Users Guide version 2.0, IBM, p. 12–1—12–8, Jun. 1993.*
H. Ossher, Events as Operations: IBM OOTIS/PCTE Object Event Notification Service Revised Proposal, OMG TC Document May 6, 1993.*
D. Ford, "Association in C++", Dr. Dobb's Journal, pp. 1–8, Aug. 1994.*
"SOMobjects Base Toolkit Users Guide", Version 2.0 (2nd Edition), Jan. 1994, US, pp. 9–1—9–8.
"Portable Object–Oriented Event Manager," IBM Technical Disclosure Bulletin, vol. 37, No. 6B, Jun. 1994, New York, US, pp. 553–555.

(List continued on next page.)

Primary Examiner—Sue Lao
(74) Attorney, Agent, or Firm—Baker Botts L.L.P.

(57) ABSTRACT

The present invention is a computer implemented system and method for providing event notification between a first application program object and a second application program object where the event is associated with a transition of the second application program object. The invention includes a stateful object (2a) for providing a set of news types (1d) associated with the event and an interest object (2d) for generating a set of interests (1e), each of the interests associating the first application program object with one of the news types. The stateful object (2a) is also for generating, in response to the transition of the second application program object, a news object (2f), the news object describing the event associated with the transition of the second application program object. The system also includes a dispatcher (2g) for dispatching the news object to the first application program object in accordance with the interest of the first application program object in the news type associated with the event described by the news object (2f) thereby providing notification of the event to the first application program object.

22 Claims, 8 Drawing Sheets

OTHER PUBLICATIONS

S. Menon, et al., "Asynchronous Event Handling In Distributed Object–Based Systems", Proceedings of the 13th International Conference on Distributed Computing Systems, May 1993, Pennsylvania, USA, pp. 383–390.

"Event Notification Mechanism", IBM Technical Disclosure Bulletin, vol. 36, No. 4, Apr. 1993,, New York, US, pp. 523–526.

Hall, et al., "Window Sockets—An Open Interface for Network Programming under Microsoft® Windows™", Version 1.1, Jan. 20, 1993, pp. 1–130.

Hall, Martin, "A Guide to Window Sockets", Jun. 1993, pp. 1–17.

* cited by examiner

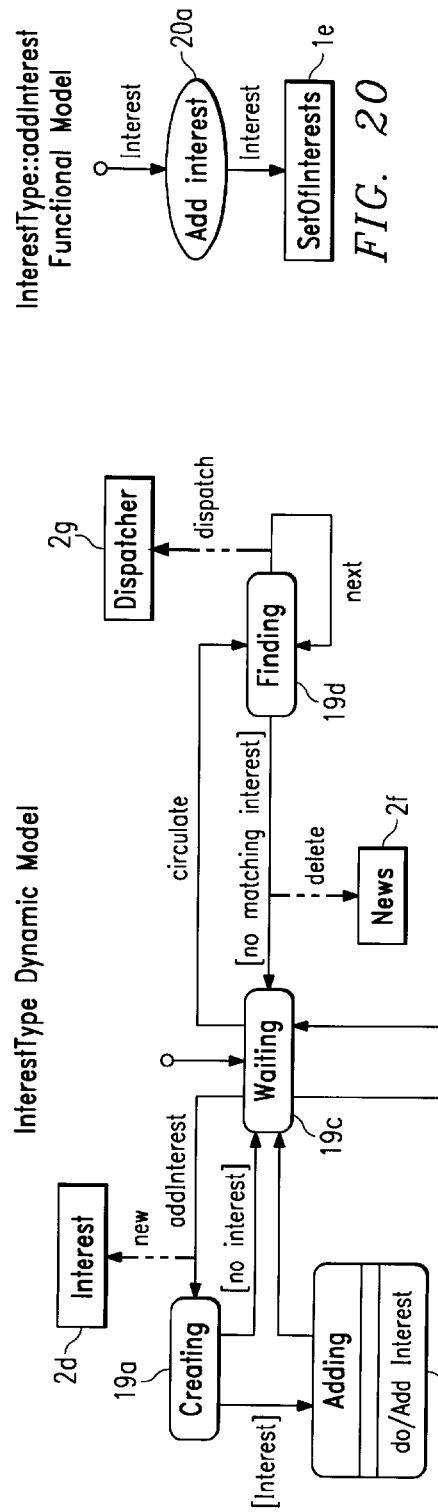
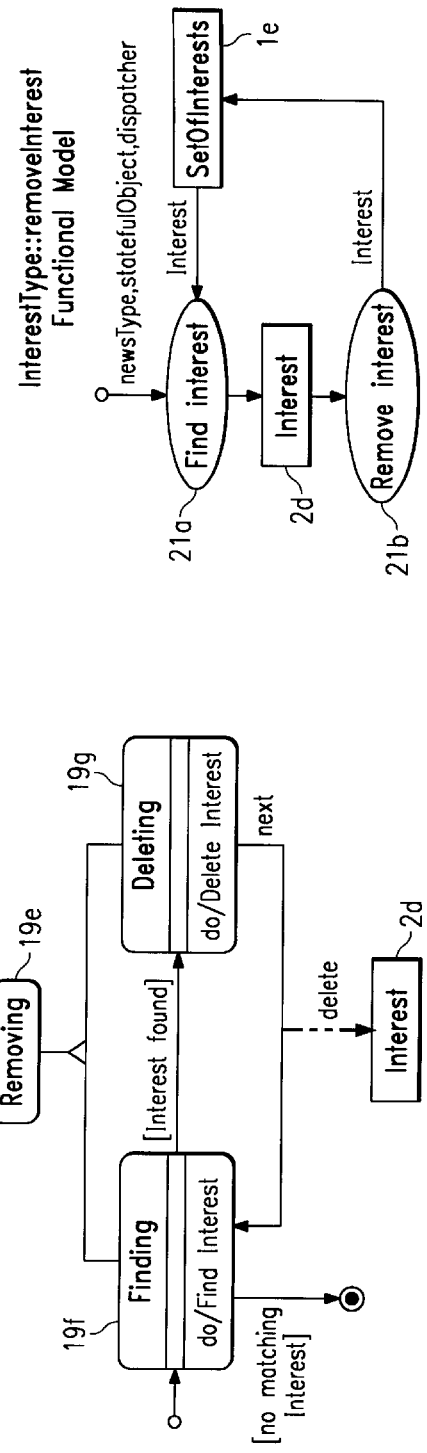
FIG. 20
FIG. 21
FIG. 19

METHOD AND SYSTEM FOR EVENT NOTIFICATION BETWEEN SOFTWARE APPLICATION PROGRAM OBJECTS

This is a continuation of application Ser. No. 08/341,247, filed Nov. 17, 1994, now abandoned.

The present invention is related to patent application Ser. No. 08/341,238, filed Nov. 17, 1994, entitled "An Object Oriented Method and System for Providing A Common Communications Interface Between Software Application Programs".

COPYRIGHT© 1994 TEXAS INSTRUMENTS INCORPORATED

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD OF THE INVENTION

The present invention relates to a method and system for providing event notification between software application program objects.

BACKGROUND OF THE INVENTION

Most computer implemented software systems include a plurality of applications, each programmed to perform a specific function. An application is composed of several programs which in turn are composed of several modules or objects. In general, each of the program objects must, at one time or another, communicate information to another program object regarding events which occur within or under control of the object.

For general reference see Comer, Douglas E and Stevens, David L., *Internetworking with TCP/IP*, vol. III, Prentice-Hall, (1993); *PIPES Platform User's Guide and Reference Maual*, PeerLogic, Inc., (1993); "X/Open Transport Interface (XTI)", *X/Open CAE Specification*, X/Open Company limited, (1992); Stevens, W. Richard, *Unix Network Programming*, Prentice-Hall, (1990); *Common Programming Interface Communications Reference*, Fourth Edition, IBM, (1991); Schmidt, Douglas, "Concurrent O-O Network Programming With C++", C++ *World*, 1994; and Bach, Maurice J., *The Design of the Unix Operating System*, Prentice-Hall, (1986).

Various problems exists, however, in managing and controlling these event notifications, especially as the number of intercommunicating objects and as the number of events which need to be communicated increase. These problems are especially acute when the objects are not included within the same application, when the objects are not executing within the same address space or when the objects are not even on the same computer. For example, an object included within a personnel system must provide event notification to another object which is included within an accounting system.

These types of systems can be described in terms of object models, functional models and dynamic models as discussed by James Rumbaugh et al. in the book *Object-Oriented Modeling and Design* published in 1991 by Prentice-Hall (the "OOMD") which is incorporated by reference in its entirety. According to the book OOMD, an object model of a system describes the object types which comprise the system and also shows the relationships between the object types. A functional model of the system shows the processes and data structures of the system and the flow of data therebetween but does not indicate the sequence of processing. The dynamic model of the system does show the sequence of processing of the system. That sequencing is shown primarily as transitions of the object types from one state to another.

The object types used to describe the system using the methodology set forth in the book OOMD include associated data structures and behaviors (or operations). Instantiations of an object type are referred to as objects or object instances. Instantiations of the data structures and behaviors associated with an object type are referred to as attributes and methods, respectively. Execution of the methods associated with a behavior or generation of an event can transition the associated object instances from one state to another. Instantiations of object types, data structures and behaviors occur, in general, when an application requests services from the system.

Thus, what is needed is a method and system for providing managed, controlled event notification between a plurality of software application program objects.

SUMMARY OF THE INVENTION

The present invention is a method and system which provide event notification between a first software application program object and a second software application program object which includes two or more states where the event is associated with a transition of the second application program object from one state to another state.

The invention includes a first means for providing a set of news types associated with one or more event types, each of which describes an event which occurs within or under control of the second application program object during the transition of the second application program object from one state to another state.

The present invention also includes a second means for generating a set of interests, each of which associates the first application program object with one of the news types included in the set of news types.

The first means is also operable to generate, in response to the transition of the second application program object from one state to another, a news object describing the event of one of the event types associated with the transition of the second application program object from one state to another.

The present invention further includes a third means for associating the first application program object with a dispatcher and for dispatching the news object to the first application program object using the dispatcher in accordance with the interest of the first application program object in the news type associated with the event described by the news object thus providing notification of the event to the first application program object.

BRIEF DESCRIPTION OF THE DRAWINGS

For a better understanding of the present invention, reference may be made to the accompanying drawings, in which:

FIG. 19 illustrates a dynamic model of the interest type object included in one embodiment of the present invention;

FIG. 20 illustrates a functional model of the add interest function of the interest type object included in one embodiment of the present invention; and FIG. 21 shows a functional model of the remove interest function of the interest type object included in one embodiment of the present invention.

DETAILED DESCRIPTION OF THE INVENTION

The present invention is a method and system for providing event notification between a first software application program object and as second software application program object. In one embodiment of the present invention, the method and system are implemented using an object oriented language, such as C++, on a digital computer.

Figure 1:
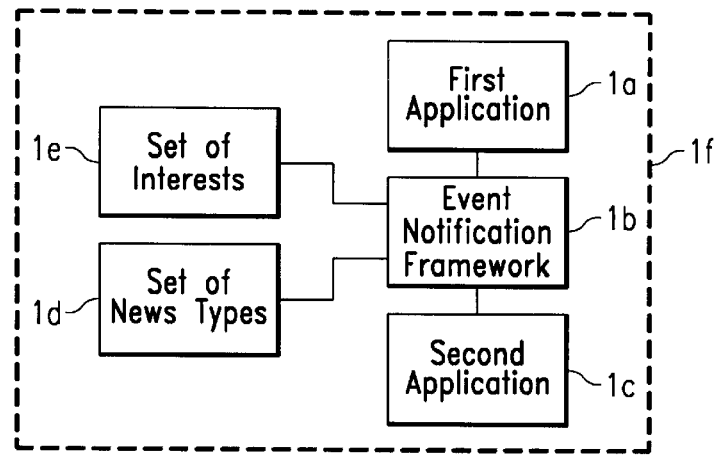
FIG. 1 is a generalized block diagram describing one embodiment of the present invention.

FIG. 1 is a block diagram of the present invention. The present invention includes an event notification framework (ENF) $1b$ which notifies a first application program object $1a$ of events of one or more predefined event types which occur within or under control of a second application program object $1c$. The ENF $1b$ notifies the first application program object $1a$ in accordance with an interest generated by the first application program object $1a$ in one or more of those event types. In other words, a third application program which has not generated an interest in that event type to which the occurring event belongs would not receive notification of the occurrence of the event. The occurrence of an event, like, for example, the execution of a method, can transition the application program from one state to another.

In one embodiment of the present invention, event types include categories of events which can occur during the operation of a system. Examples of event types include printing events, searching events, storing events, etc. The event types to which the first application program object $1a$ can express an interest and the representation of those event types vary and are dependent upon the implementation of the second application program object $1b$ which generates the events. Each event type on which the second application program object $1b$ will generate external notifications is represented by a corresponding news type stored in the data structure set of news types $1d$. The first application program object $1a$ expresses an interest in an event type on which the second application program object $1b$ generates external notification by storing an associated interest in the data structure set of interests $1e$.

Thus, as shown in FIG. 1, there are two primary data structures associated with the ENF $1b$ of the present invention. These data structures include a set of interests $1e$ and a set of news types $1d$. In the present invention, a set includes not only information content but also behaviors and attributes associated with the information for manipulating and describing, respectively, the information included within the set.

The interests generated by the first application program object $1a$ are stored in the data structure set of interests $1e$. The data structure set of interests $1e$ may be implemented dynamically, for example, as a doubly linked list of pointers to files containing the data defining each interest. Each interest stored in the data structure set of interests $1e$ includes a news type identifier, a stateful object identifier and a dispatcher identifier which identify the event type that the first application program object $1a$ is interested in, the application program object which generates events of the event type in which the first application program object $1a$ is interested in, and how the first application program object $1a$ receives notification of those events, respectively.

Each event which occurs within or under the control of the second application program object $1c$ is described by an event type which is associated with a news type stored within the data structure set of news types $1d$. The event types are defined by the particular implementation and function of the second application program object $1c$. The data structure set of news types $1d$ may be implemented dynamically, for example, as a doubly linked list of pointers to memory locations which contain the news type information, or, statically, for example, as a header included in source program files.

Figure 2:
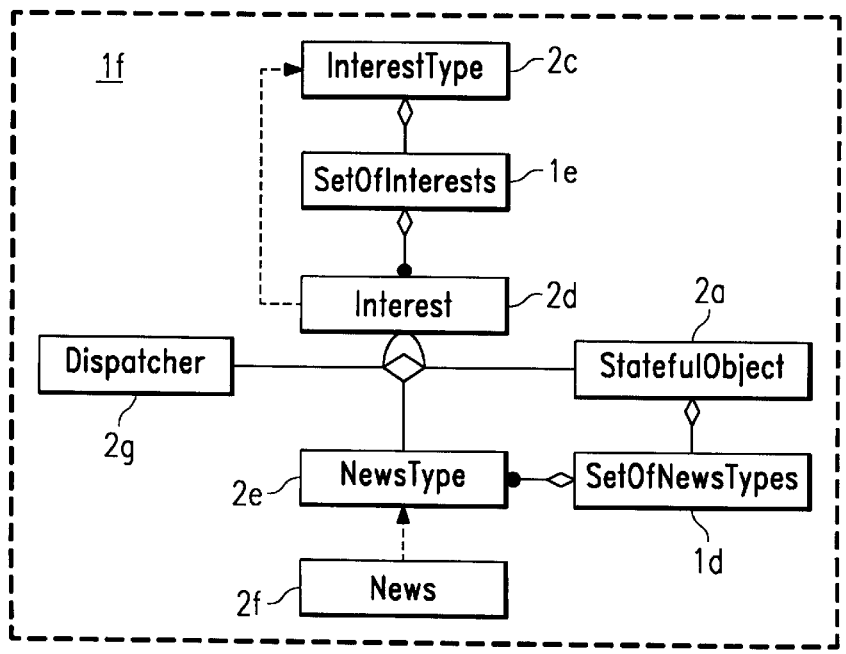
FIG. 2 is a generalized object model describing one embodiment of the present invention.

FIG. 2 shows an object model for the event notification framework (ENF) $1b$ of the present invention. As shown in FIG. 2, the ENF $1b$ of the present invention includes a stateful object $2a$, a news type object $2e$, a news object $2f$, an interest type object $2c$, an interest object $2d$ and a dispatcher object $2g$.

The stateful object $2a$ represents any application object which wants to notify some other application object, which may or may not be within the same application, of some event asynchronously to when the event happens. For example, a first application program object, which sends data to a printer, would need to know when a second application program object, which generates the data, has completed processing. In this case, the second application program object is the stateful object 2a. On the other hand, the second application program object, which generates the data to be printed, would need to be notified by the first application program object that the print is done or that some error has occurred which prevents the printing operation to continue, i.e., the print is powered off, off line or out of paper. In this case, the first application program object is the stateful object 2a.

Thus, the ENF 1b of the present invention, as illustrated in FIG. 1, provides the mechanisms for the second application program object 1c to be identified as an application program object having at least two possible states by defining it as an instance of the stateful object 2a, defining each of the possible state transitions as instances of the news type object 2e and to generate instances of the news object 2f in response to the transitions of the stateful object 2a from one of its possible states to another.

The corresponding instance of the news object 2f includes event attributes, defined by the application object, and is dispatched by an instance of the dispatcher object 2g to the first application program object 1a which has generated an interest, stored in the data structure set of interests 1e, in the news type object 1b associated with the event. An object model of the news object 2e is illustrated in FIG. 15.

Figure 18:
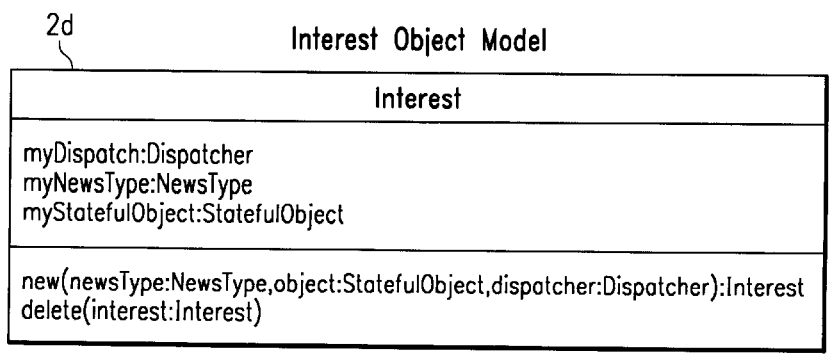
FIG. 18 shows an object model of an interest object included in one embodiment of the present invention.

The ENF 1b of the present invention also provides the mechanisms for the first application program object 1a to receive notification of events of the event types associated with the second application program object 1c by generating an interest object 2d and associating that interest object 2d with an instance of the news type object 2e. An object model of the interest object 2d is shown in FIG. 18.

Figure 3:
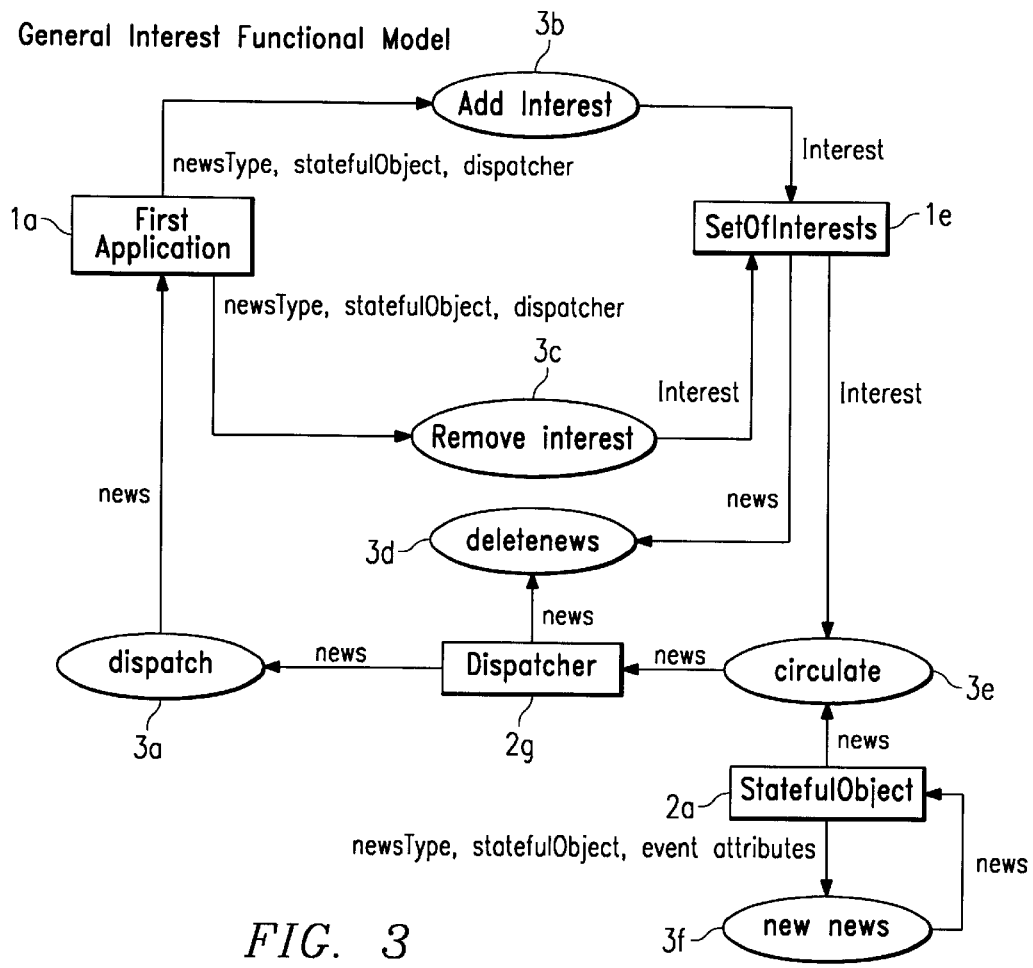
FIG. 3 shows a functional model describing one embodiment of the present invention.
Figure 14:
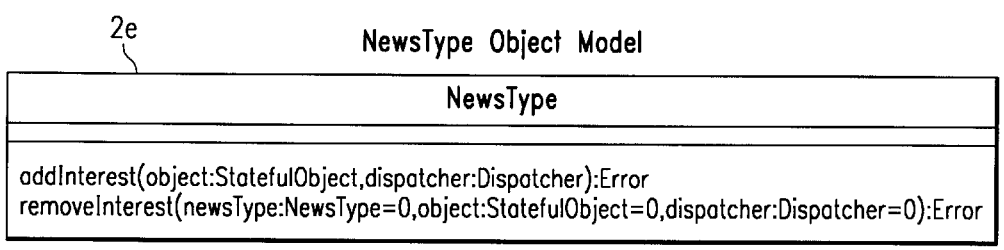
FIG. 14 is an object model of a news type object included in one embodiment of the present invention.

As illustrated in the functional model in FIG. 3, the first application program object 1a uses an add interest function 3b to add an interest to the data structure set of interests 1e as an instance of the interest object 2d. A remove interest function 3c is used to terminate notification to the first application program object 1a of the associated event by removing the interest object 2d from the data structure set of interests 1e. Both the add interest 3b and the remove interest 3c functions are behaviors included in the news type object 2e as shown in the object model of the news type object illustrated in FIG. 14.

Figure 15:
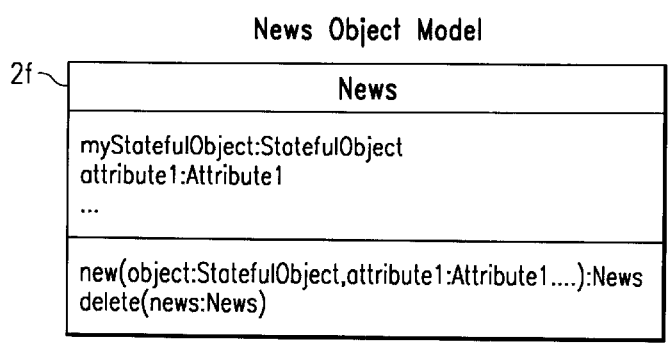
FIG. 15 is an object model of a news object included in one embodiment of the present invention.
Figure 16:
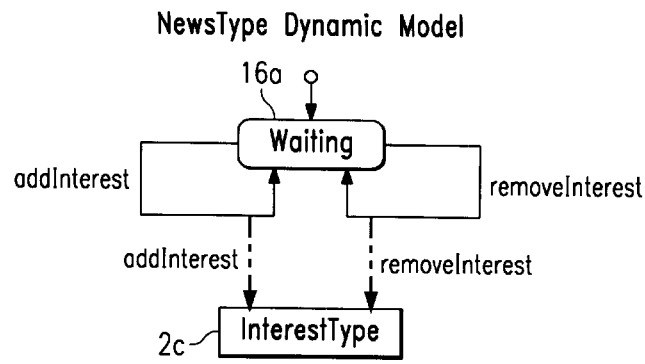
FIG. 16 depicts a dynamic model of the news type object included in one embodiment of the present invention.
Figure 17:
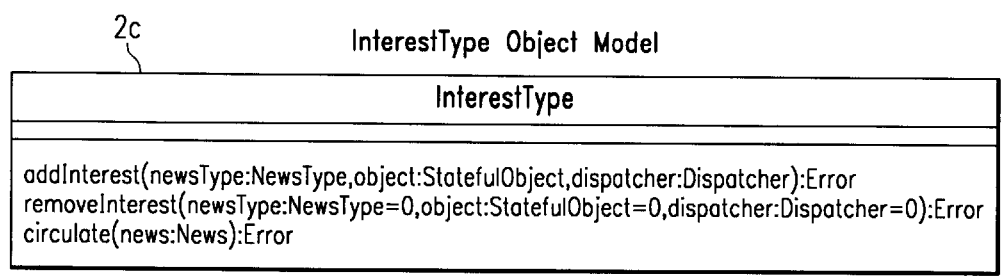
FIG. 17 shows an object model of an interest type object included in one embodiment of the present invention.

As shown in the dynamic model of the news type object 2e illustrated in FIG. 15, the add interest function 3b and the remove interest function 3c in turn initialize correspondingly named behaviors in the interest type object 2c. An object model and dynamic model of the interest type object 2c are illustrated in FIGS. 17 and 19, respectively.

Figure 4:
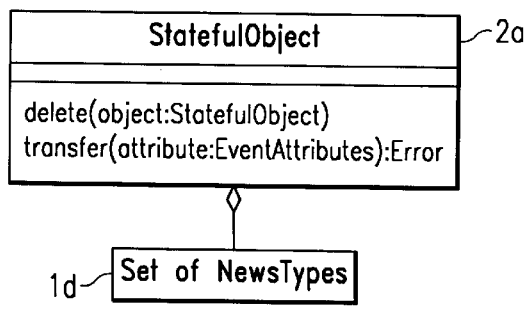
FIG. 4 depicts an object model of a stateful object included in one embodiment of the present invention.
Figure 5:
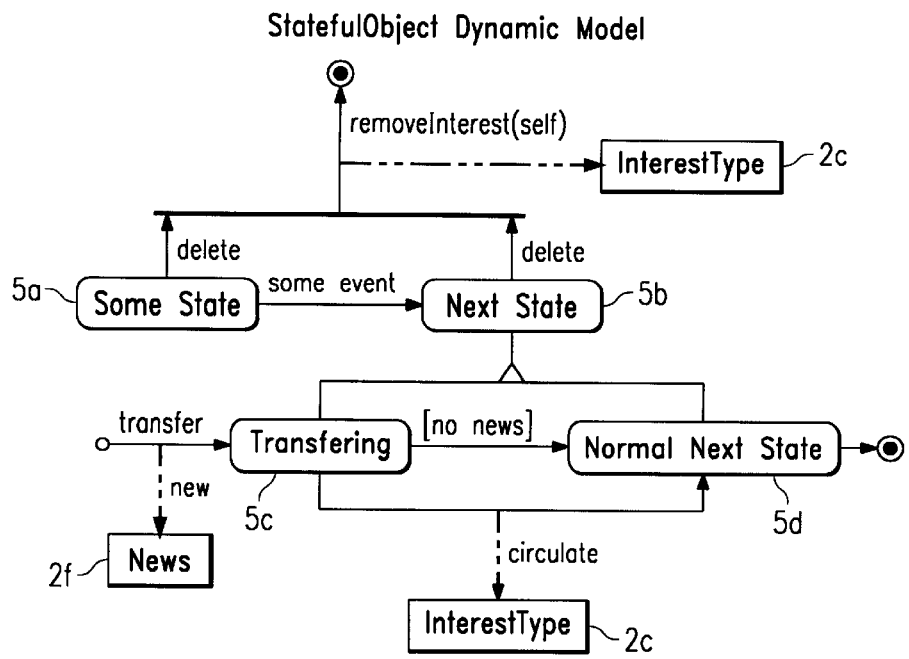
FIG. 5 shows a dynamic model of the stateful object included in one embodiment of the present invention.

When an event occurs in the stateful object 2a, a news object 2f is generated using a new news function 3f. A circulate function 3e finds all interest in the data structure set of interests 1e which are associated with the news type 2e of the generated news object 2f by exhaustively searching the data structure set of interests 1e for the stateful object identifier and news type identifier associated with the news object 2f. The stateful object identifier included in the news object 2f references the instance of the stateful object 2a which generated the news object 2f. The circulate function 3e then provides news object 2f which includes the event information to an instance of the dispatcher object 2g in accordance with the dispatcher identifier included in the interest found in the data structure set of interests 1e. An object and dynamic model of the stateful object 2a are illustrated in FIGS. 4 and 5, respectively.

Upon receipt of the news object 2f, a dispatch function 3a dispatches the news object 2f to the first application program object 1a. After the news object 2f is dispatched or if the no interest in the news object 2f was found in the data structure set of interests 1e, the news objects 2f is deleted using the delete news function 3d.

Figure 6:
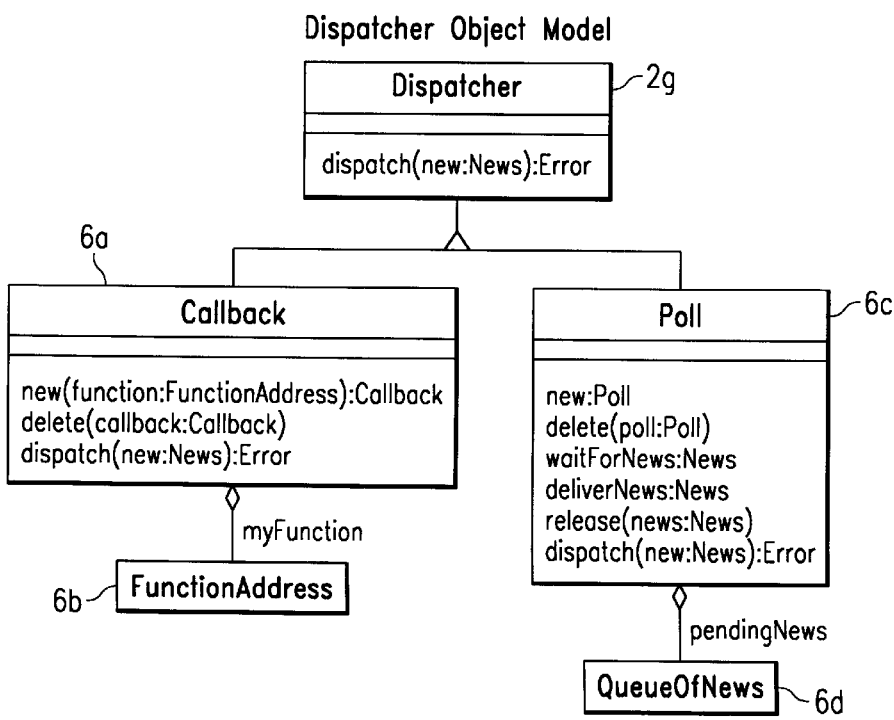
FIG. 6 illustrates an object model of a dispatcher object included in one embodiment of the present invention.

An object model of the dispatcher object 2g is shown in FIG. 6. As shown in FIG. 6, the dispatcher object 2g includes a callback object 2a and a poll object 6c representing two types of dispatches available in one embodiment of the present invention.

Figure 7:
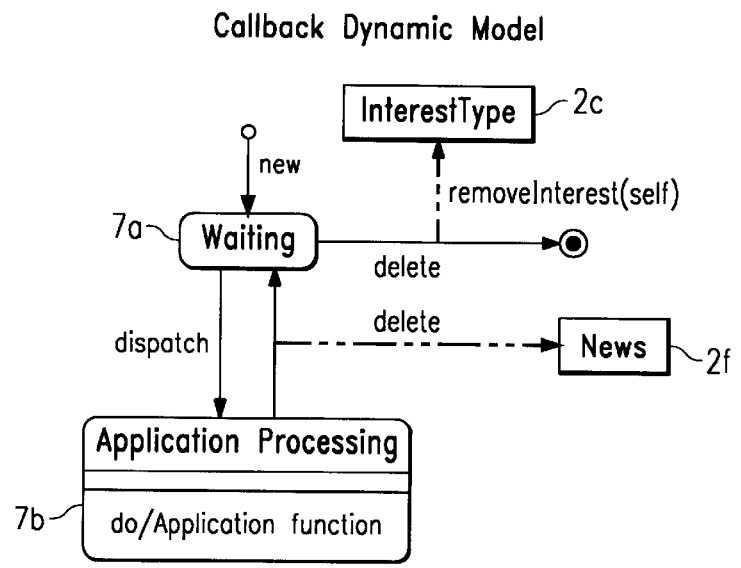
FIG. 7 shows a dynamic model of a callback object which is one implementation of the dispatcher object in one embodiment of the present invention.

The callback object 6a is used when the first application program object 1a is to receive news objects 2f as arguments in a function call to a procedure included in the first application program object 1a. When the procedure completes its processing, the news object 2 is deleted. The operation of the callback object 6a is illustrated in more detail in the dynamic model shown in FIG. 7.

Figure 8:
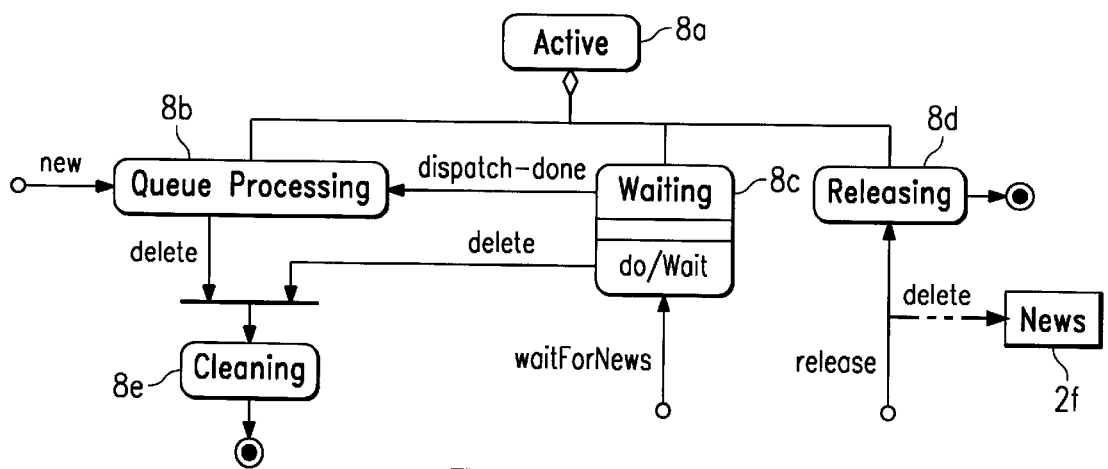
FIG. 8 is a dynamic model of a poll object which is another implementation of the dispatcher object in one embodiment of the present invention.
Figure 9:
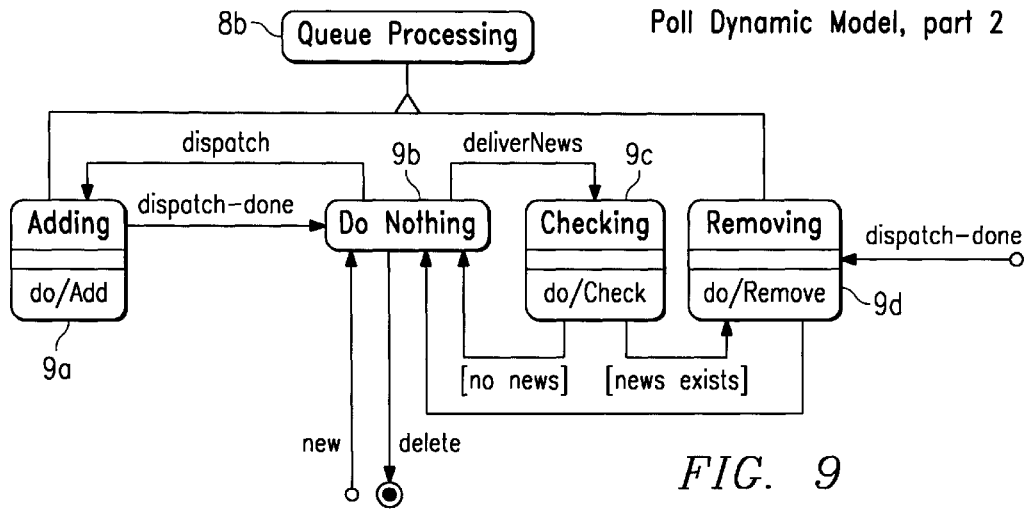
FIG. 9 is a dynamic model of queue processing state included in the dynamic model of the poll object in one embodiment of the present invention.
Figure 10:
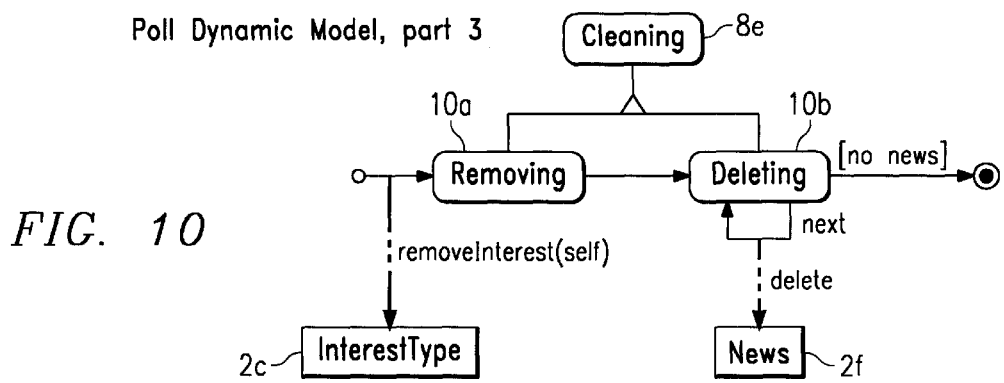
FIG. 10 is a dynamic model of a cleaning state included in the dynamic model of the poll object in one embodiment of the present invention.
Figure 11:
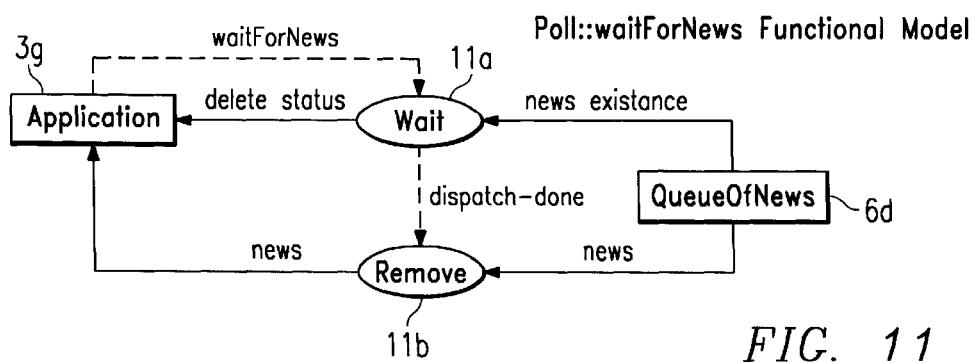
FIG. 11 illustrates a functional model of a wait for news function of the poll object in one embodiment of the present invention.
Figure 12:
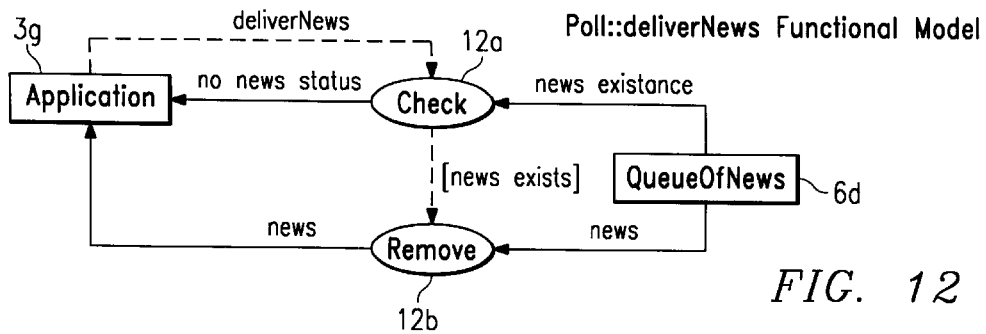
FIG. 12 illustrates a functional model of a deliver news function of the poll object in one embodiment of the present invention.
Figure 13:
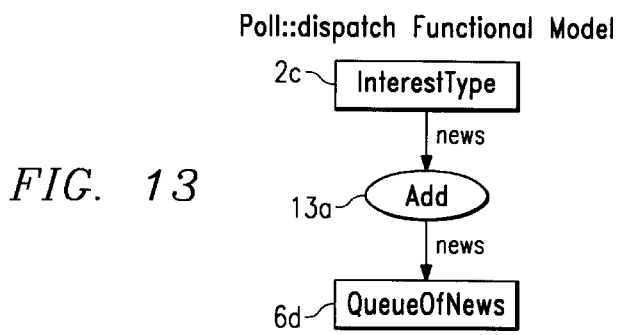
FIG. 13 illustrates a functional model of a dispatch function of the poll object in one embodiment of the present invention.

The poll object 6c is used to queue news objects 2f so that the first application program object 1a can receive the news objects 2f at a later time. The news objects 2f are queued to the data structure Queue of News 6d. The operation of the poll object 6a is illustrated in more detail in the dynamic models shown in FIGS. 8–10 and in the functional models shown in FIGS. 11–13.

In another embodiment of the present invention, the first application program object 1a is itself a dispatcher and thus the first application program object 1a inherits the behaviors associated with the dispatcher object 2g.

Thus, an application can generate an instance of the interest object 2d for a particular news type 2e defined by an instance of the stateful object 2a, which will be dispatched through an instance of the dispatcher object 2g. While this instance of the interest object 2d exists, when the corresponding event occurs within the associated instance of the stateful object 2a, an instance of the news object 2f is created and transmitted to the instance of the dispatcher object 2g referenced by the instance of the interest object 2d. Then, in accordance with the dispatcher object 2g, the instance of the news object 2f is dispatched to the interested first application program object 1a.

Although the present invention has been described in detail, it should be understood that various changes, substitutions and alterations can be made thereto without departing from the spirit and scope of the present invention as defined by the appended claims.

What is claimed is:

1. A computer implemented method for providing event notification between program objects, comprising:

providing a set of news types, wherein each news type in said set of news types is associated with a state transition of a stateful object;

generating a set of interests, at least one of the interests in said set of interests associating an application program object with at least one of said news types;

wherein said interest identifies an event type associated with the state transition of the news type that the application program object is interested in and identifies the stateful object which generates an event of the event type which the application program object is interested in;

generating, in response to said state transition, a news object, said news object comprising event attributes associated with said state transition and operable to describe said state transition;

wherein the event attributes include the event type;

receiving said news object in a dispatch module; and dispatching said news object from said dispatch module to said application program object in accordance with said interest of said application program object in said news type so as to provide notification of said state transition to said application program object.

2. A computer implemented method for providing event notification between program objects, comprising:

providing a set of news types, at least one news type in the set of news types associated with a state transition of a stateful object from one of at least two states to another of said at least two states;

generating a set of interests, at least one of the interests in said set of interests associating an application program object with at least one of said news types;

wherein said interest identifies an event type associated with the state transition of the news type that the application program object is interested in and identifies the stateful object which generates an event of the event type which the application program object is interested in; generating, in response to said state transition, a news object, said news object comprising event attributes associated with said state transition and operable to describe said state transition;

wherein the event attributes include the event type;

receiving said news object in a dispatch module; and dispatching said news object from said dispatch module to said application program object in accordance with said interest of said application program object in said news type so as to provide notification of said transition to said application program object.

3. A computer implemented method for providing event notification between program objects, comprising:

providing a set of news types, at least one of said news types in said set of news type associated with a state transition of a stateful object from one of at least two states to another of said at least two states;

generating a set of interests, at least one of the interests in said set of interests associating an application program object with one of said news types;

wherein said interest identifies an event type associated with the state transition of the news type that the application program object is interested in and identifies the stateful object which generates an event of the event type which the application program object is interested in;

generating, in response to said state transition, a news object, said news object comprising event attributes associated with said state transition and operable to describe said state transition;

wherein the event attributes include the event type;

receiving said news object in a dispatch module;

dispatching said news object from said dispatch module to said application program object in accordance with said interest of said application program object in said news type so as to provide notification of said state transition to said application program object; and removing, in response to a request from said application program object, said interest of said application program object in said news type from said set of interests so as to terminate said notification to said application program object of said state transition.

4. The method of claim 3 wherein said dispatching step includes the step of calling a function of said application program object in accordance with said interest of said application program object in said news type, said news object included as an argument to said function.

5. The method of claim 3 wherein said dispatching step includes the steps of:

storing said news object in a queue of news objects so that said application program object can receive said news object at a later time;

dispatching said news object from said queue of news to said application program object in response to a poll of said queue of news by said application program object; and removing said news object from said queue of news in response to said dispatching step.

6. A computer implemented system for providing event notification between program objects, comprising:

first means for providing a set of news types, wherein each news type in said set of news types is associated with a state transition of a stateful object;

second means coupled to said first means for generating a set of interests, at least one of the interests in said set of interests associating an application program object with at least one of said news types;

wherein said interest identifies an event type associated with the state transition of the news type that the application program object is interested in and identifies the stateful object which generates an event of the event type which the application program object is interested in;

said first means further including means for generating, in response to said state transition, a news object, said news object comprising event attributes associated with said state transition and operable to describe said state transition;

wherein the event attributes include the event type; and third means coupled to said second means for receiving said news object and dispatching said news object to said application program object in accordance with said interest of said application program object in said news type so as to provide notification of said state transition to said application program object.

7. A computer implemented systems for providing event notification between program objects, comprising:

first means for providing a set of news types, wherein each news type in said set of news types is associated with a state transition of a stateful object from one of at least two states to another of said at least two states;

second means coupled to said first means for generating a set of interests, at least one of the interests in said set of interests associating an application program object with one of said news types;

wherein said interest identifies an event type associated with the state transition of the news type that the application program object is interested in and identifies the stateful object which generates an event of the event type which the application program object is interested in;

said first means further including means for generating, in response to said state transition a news object, said news object comprising event attributes associated with said state transition and operable to describe said state transition;

wherein the event attributes include the event type; and third means coupled to said second means for receiving said news object and dispatching said news object to said application program object in accordance with said interest of said application program object in said news type so as to provide notification of said state transition to said application program object.

8. A computer implemented system for providing event notification between program objects, comprising:

first means for providing a set of news types, wherein each news type in said set of news types is associated with a state transition of stateful object from one of at least two states to another of said at least two states;

second means coupled to said first means for generating a set of interests, at least one of the interests in said set of interests associating an application program object with at least one of said news types;

wherein said interest identifies an event type associated with the state transition of the news type that the application program object is interested in and identifies the stateful object which generates an event of the event type which the application program object is interested in;

said first means further including means for generating, in response to said state transition, said news object comprising event attributes associated with said state transition and operable to describe said state transition;

wherein the event attributes include the event type;

third means coupled to said second means for receiving said news object and dispatching said news object to said application program object in accordance with said interest of said application program object in said news type providing notification of said state transition to said application program object; and said second means further including means for removing, in response to a request from said application program object, said interest of said application program object in said news type from said set of interests so as to terminate said notification of said state transition to said application program object.

9. The method of claim 8, wherein each said interest in said set of interests include a dispatcher identifier.

10. The method of claim 9, wherein said dispatcher identifier identifies how said application program object receives notification of said events.

11. The method of claim 9 wherein said set of news types is implemented dynamically.

12. The method of claim 1 wherein said application program object is within an application program common to said stateful object.

13. A computer implemented method for providing event notification between program objects, comprising:

providing a set of news types, wherein each news type in said set of news types is associated with a state transition of a stateful object;

wherein said stateful object further comprises a plurality of states;

generating a set of interests, at least one of the interests in said set of interests associating an application program object with at least one of said news types;

wherein said interest identifies an event type associated with the state transition of the news type that the application program object is interested in and identifies the stateful object which generates an event of the event type which the application program object is interested in;

generating, in response to said state transition, a news object, said news object comprising event attributes associated with said state transition and operable to describe each said state transition;

wherein the event attributes include the event type;

searching the set of interests and at least one of the news types for an identifier associated with the stateful object;

receiving said news object in a dispatch module;

asynchronously dispatching said news object from said dispatch module to said application program object in accordance with said interest of said application program object in said news type so as to provide notification of said state transition to said application program object.

14. The computer implemented method for providing event notification between program objects according to claim 1, wherein the set of news types and the set of interests are respective data structures associated with an event notification framework.

15. The computer implemented method for providing event notification between program objects according to claim 14, wherein the data structures are dynamic.

16. The computer implemented method for providing event notification between program objects according to claim 1, wherein the set of interests includes interest information, behaviors associated with manipulating the interest information, and attributes associated with describing the interest information and wherein the set of news types includes news type information, behaviors associated with manipulating the news type information, and attributes associated with describing the news type information.

17. The computer implemented method for providing event notification between program objects according to claim 2, wherein the set of interests includes interest information, behaviors associated with manipulating the interest information, and attributes associated with describing the interest information and wherein the set of news types includes news type information, behaviors associated with manipulating the news type information, and attributes associated with describing the news type information.

18. The computer implemented method for providing event notification between program objects according to claim 3, wherein the set of interests includes interest information, behaviors associated with manipulating the interest information, and attributes associated with describing the interest information and wherein the set of news types includes news type information, behaviors associated with manipulating the news type information, and attributes associated with describing the news type information.

19. The computer implemented method for providing event notification between program objects according to claim 6 wherein the set of interests includes interest information, behaviors associated with manipulating the interest information, and attributes associated with describing the interest information and wherein the set of news types includes news type information, behaviors associated with manipulating the news type information, and attributes associated with describing the news type information.

20. The computer implemented method for providing event notification between program objects according to claim 7 wherein the set of interests includes interest information, behaviors associated with manipulating the interest information, and attributes associated with describing the interest information and wherein the set of news types includes news type information, behaviors associated with manipulating the news type information, and attributes associated with describing the news type information.

21. The computer implemented method for providing event notification between program objects according to claim 8, wherein the set of interests includes interest information, behaviors associated with manipulating the interest information, and attributes associated with describing the interest information and wherein the set of news types includes news type information, behaviors associated with manipulating the news type information, and attributes associated with describing the news type information.

22. The computer implemented method for providing event notification between program objects according to claim 13, wherein the set of interests includes interest information, behaviors associated with manipulating the interest information, and attributes associated with describing the interest information and wherein the set of news types includes news type information, behaviors associated with manipulating the news type information, and attributes associated with describing the news type information.

* * * * *